Dec. 8, 1959  F. W. VAN LUIK  2,915,939
HIGH SPEED CONDENSATION NUCLEI MEASURING DEVICE
Filed April 30, 1957  2 Sheets-Sheet 1
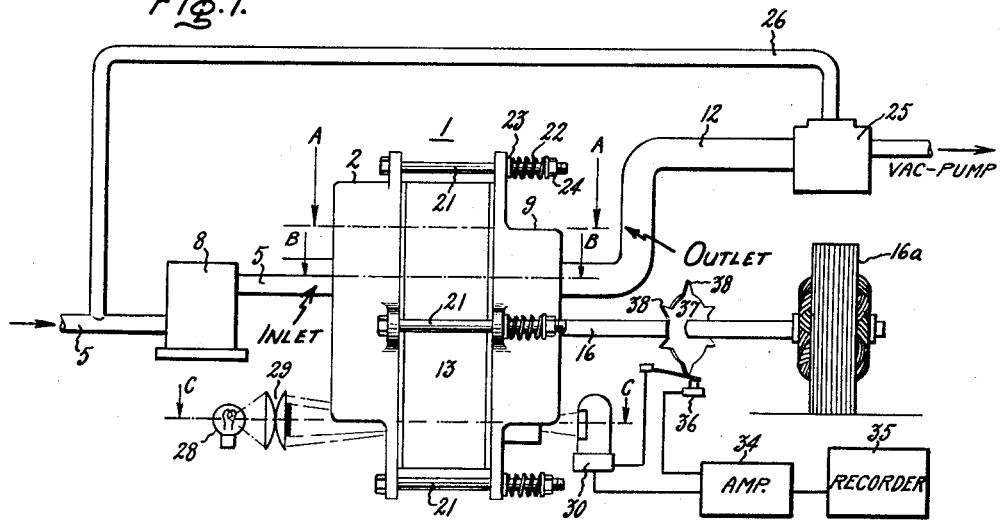
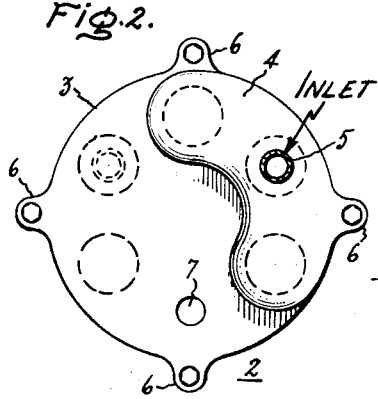
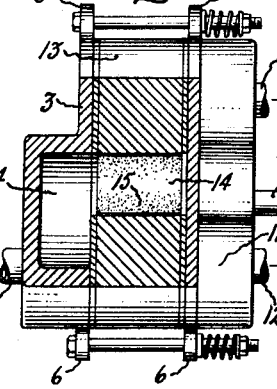
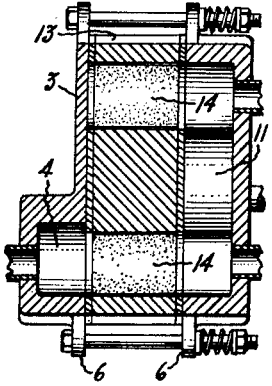
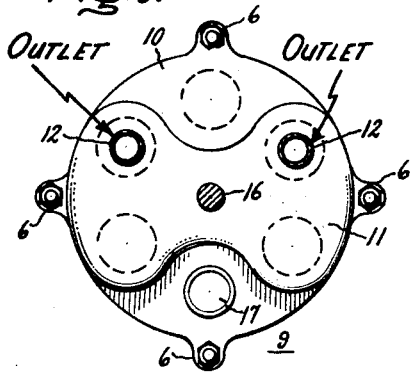
Inventor
Frank W. Van Luik
by Merton D Moree
His Attorney Dec. 8, 1959 — F. W. VAN LUIK — 2,915,939
HIGH SPEED CONDENSATION NUCLEI MEASURING DEVICE
Filed April 30, 1957 — 2 Sheets-Sheet 2

Inventor
Frank W. Van Luik
by Merton D. _____
His Attorney

United States Patent Office 2,915,939
Patented Dec. 8, 1959

2,915,939

HIGH SPEED CONDENSATION NUCLEI MEASURING DEVICE

Frank W. Van Luik, Schenectady, N.Y., assignor to General Electric Company, a corporation of New York Application April 30, 1957, Serial No. 655,999

6 Claims. (Cl. 88—14)

This invention relates to an apparatus for detecting and measuring with extreme rapidity small airborne particles, more particularly those known as condensation nuclei.

Condensation nuclei is a generic name given to those small airborne particles which are characterized by the fact that they serve as the nuclei on which a fluid, such as water for example, condenses to form droplet clouds. Condensation nuclei, as this term is understood in the art, encompasses particles ranging in size from $1 \times 10^{-4}$ cm. radius to $1 \times 10^{-8}$ cm. radius, although the most significant portion, numerically of this range lies between $5 \times 10^{-5}$ and $5 \times 10^{-7}$ cm. radius.

Due to the minute size of these particles difficulties of great magnitude are encountered in their measurement since particles in the microscopic and submicroscopic range are involved. As a consequence, techniques involving light absorption and scattering are of little utility since the nuclei per se are small relative to the wavelength of visible light and, consequently, no accurate and reproducible results can be achieved. As a consequence, techniques and instruments have been developed for measuring these nuclei, which rely on their property of acting as the centers of condensation for water drops. By thus causing condensation of water vapor about these particles their size and mass is increased by many orders of magnitude so that the available light absorption and scattering techniques may be utilized.

The mechanism involved in initiating the condensation of water vapor on the nuclei is directly related to the relative humidity of the gaseous medium bearing the nuclei. That is, if the humidity of such a gaseous medium tends to rise above 100%, as would occur by a sudden cooling of the medium, a condition of instability (i.e. supersaturation) exists instantaneously. The existence of such a condition of instability starts the deposition of vapor, such as water, on the nuclei to re-establish equilibrium conditions and produces a cloud of droplets in the gaseous medium. The deposition of the vapor continues and the droplets grow in size until the humidity is lowered to a new equilibrium condition representing substantially 100% relative humidity for the new temperature. Thus, the cooling of a gaseous medium by artificial means, with the attendant supersaturation, may be utilized to trigger such a condensing mechanism about any nuclei and provides a means for measuring them.

In the prior art devices for detecting and measuring condensation nuclei, it has been customary to subject the nuclei bearing gaseous medium to an adiabatic expansion in order to achieve the rapid cooling which initiates the condensation process. Typically, in such apparati, a sample of a nuclei bearing gaseous medium is drawn into an expansion chamber traversed by a beam of radiant energy, permitted to come to an equilibrium condition, and expanded by means of a pump or source of lower pressure initiating formation of a droplet cloud. The droplet cloud thus formed grows until the droplets are of sufficient size to be measured by a beam of radiant energy. The sample containing the droplet cloud is then flushed out of the chamber and the cycle is repeated.

It will be appreciated from the above description that in these prior art devices the rate of operation of the instrument is determined by time required to carry out the preliminary operations of flushing, filling, etc., prior to measuring the density of the droplet cloud.

In actuality, however, the only really limiting factor on sampling rate should be the time necessary to permit the growth of the droplets formed about the nuclei to a sufficient size to be detected and measured by means of a beam of radiant energy. That is, experimental work has shown that for practical ranges of expansion induced supersaturated conditions (i.e., from 100% to 400%) the minimum growth time for the droplets is approximately 5 milliseconds (.005 second). Thus, theoretically the sampling speed is limited only by the growth time of the droplets and thus the sampling speed is limited to a speed of approximately 200 samplings per second which is a speed several orders of magnitude larger than that achieved by presently available devices.

In order to achieve such a nuclei measuring instrument whose speed of operation is limited only by the growth time of the droplet cloud once expansion has been initiated, it is desirable to carry out the different respective portions of the operational cycle for each of a multitude of samples simultaneously. In this manner by advantageously utilizing the time normally wasted in the preparation of one sample for measurement to ready subsequent samples, it becomes possible to increase the speed of the instrument substantially.

It is an object of this invention, therefore, to provide a high speed continuous condensation nuclei measuring device.

Another object of this invention is to provide a condensation nuclei measuring device wherein a multiplicity of nuclei bearing gaseous samples are simultaneously treated.

A further object of this invention is to provide a high speed condensation nuclei measuring device wherein measurement of one sample occurs while others are readied for measurement.

Still another object of this invention is to provide a high speed condensation nuclei measuring device whose sampling and measuring speed is limited only by the growth time of the droplet cloud about said nuclei.

Further objects and advantages of the invention will appear as the description of the invention proceeds.

In accordance with the invention, the foregoing objects are accomplished by providing an apparatus wherein a multiplicity of gaseous samples are simultaneously and sequentially treated preparatory to being measured. In this fashion the different time consuming operations of the cycle are being performed on a group of samples prior to measurement while another sample is being measured to provide an indication of the nuclei concentration.

The novel features which are believed to be characteristic of this invention are set forth with particularity in the appended claims. The invention itself, however, both as to its organization and method of operation may best be understood by reference to the following description taken in connection with the accompanying drawings in which:

Figure 1 shows a schematic view of the novel apparatus of the invention;

Figure 2 is an elevational view of the inlet manifold of Figure 1;

Figure 3 is an elevational view of the outlet manifold of the apparatus of Figure 1;

Figure 5 is a sectional view of the manifold and rotating chamber of Figure 1 taken along the lines B—B;

Figure 6 is a sectional view of the manifold and rotating chamber of Figure 1 taken along the lines A—A;

Figure 7 is a detailed view, partially in section, of the optical system of Figure 1 taken along the lines C—C.

Figure 4:
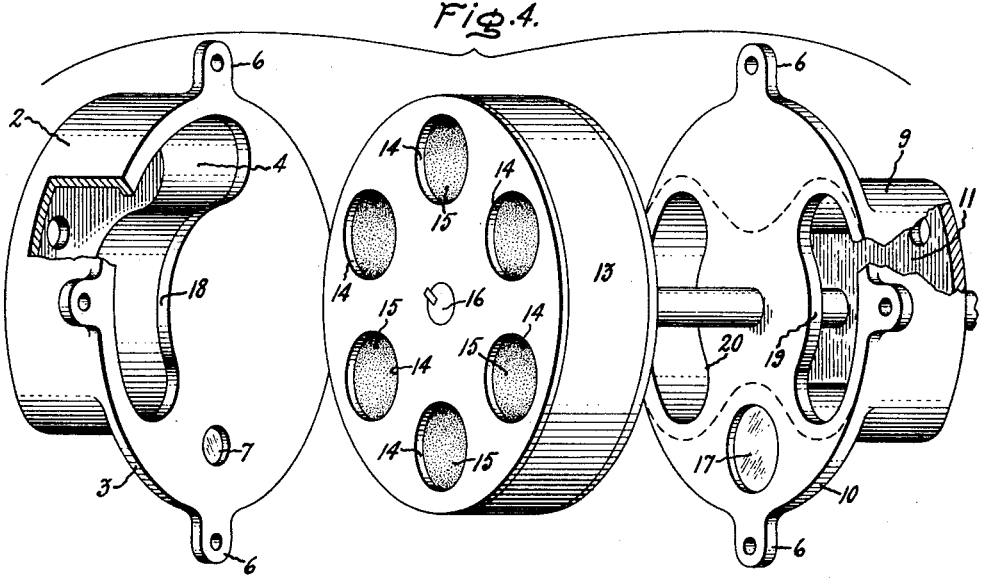
Figure 4 is an exploded perspective of the manifold and rotating chamber of Figure 1.

Referring now to Figure 1, this figure shows an embodiment of a high speed condensation nuclei detecting and measuring apparatus illustrating the instant invention. The apparatus comprises means whereby a multiplicity of nuclei bearing gaseous samples are processed simultaneously through different steps of the operational cycle whereby one sample is being measured while the remaining samples are being readied for measurement.

To this end nuclei bearing gaseous media are applied to an inlet manifold 2 by means of an inlet conduit 5. Positioned in the conduit 5 is humidifying element 8 which brings the media to 100% relative humidity and which may be of any well known construction. A chamber means illustrated at 13 adapted to hold a multiplicity of the nuclei bearing gaseous samples simultaneously is positioned between the inlet manifold 2 and a complementary outlet manifold 9 and is sealed against leakage by a spring induced force provided by the bolts 21, the spring member 22, the collar 23, and the nuts 24 in a manner illustrated in Figure 1.

The chamber member 13, the precise configuration of which will be explained in greater detail later, is driven by means of a motor 16a and a shaft 16 upon which the member is mounted so that the nuclei bearing gaseous samples may be processed simultaneously. A bifurcated outlet conduit 12 communicates with the manifold 9 and is connected through a control valve 25 to a means, such as a vacuum pump, which for the sake of simplicity is not illustrated, for sequentially expanding the individual samples.

The control valve, in conjunction with an additional conduit 26, which is maintained at ambient or input pressure, controls the exact pressure differential applied to the manifold 9 and consequently the gaseous samples. The control valve 25 may be any one of a number of well known types, such as for exmaple one wherein the pressure from the conduit 26 is balanced against a spring force exerted against a washer or disc member so as to permit the gaseous medium from conduit 26 to bleed into the line if the pressure drop produced by the pump exceeds the desired differential.

Positioned adjacent to the lower portion of the assembly 1 is a measuring means including a source of radiant energy 28, such as an incandescent lamp or the like, which is projected by means of a lens assembly 29 through one chamber of the assembly and onto a radiation sensitive device 30 to produce an electrical output signal which is an index of the droplet cloud density produced in the individual samples and consequently of the number of nuclei. The output of the radiation sensitive device 30 is connected through a switch 36 to an amplifying means 34 and in turn to a recording or measuring means 35.

Figure 2 shows the inlet manifold 2, referred to in describing Figure 1, which comprises a circular end or cover plate 3 having an inlet chamber portion 4 of kidney-shaped configuration. The inlet conduit 5 extends into the chamber and provides a continuous supply of nuclei bearing gaseous medium, which is to be measured. A multiplicity of tab members 6 positioned around the periphery of plate 3 provide, in conjunction with the bolts 21, etc., a means for fastening and positioning the inlet manifold. A small circular transparent port 7 positioned in and extending through the lower portion of the cover plate 3 comprises a suitable means for transmitting radiant energy which is utilized to determine the density of the droplet clouds formed in the individual gaseous samples.

Figure 3 illustrates the configuration of the complementary outlet manifold 9 at the opposite side of the apparatus. This member is similarly constructed of a circular flat cover plate 10 having positioned thereon an output chamber 11 having the bifurcated outlet conduit 12 communicating therewith. In a similar manner to inlet manifold 2, a number of tab members 6 are positioned around the periphery of the covering plate 10 to provide a means for positioning and fastening the outlet manifold.

Positioned in the lower portion of the flat covering plate 10 is a port 17 to permit passage of light or radiant energy which, in conjunction with the opening 7 of the inlet manifold, forms a portion of the measuring system for the apparatus to be described.

Figure 4 is an exploded view of the apparatus of Figure 1 showing the interior chamber 4 of manifold 2 to which the conduit 5 is connected and having an aperture 18 communicating with the sampling portion 13 of the apparatus presently to be described. It also shows at 11 the interior chamber of the outlet manifold having an aperture to which the outlet conduit 12 is connected and having two kidney-shaped apertures 19 and 20, which cooperate with the sampling portion 13 of the apparatus.

The sampling portion 13 of the apparatus comprises a rotating chamber 13 between the two manifolds 2 and 9 having therein bores, or passages, 14 which extend axially through the chamber in parallel relation and which at predetermined positions of the chamber in its rotation communicate with the chamber 4 in manifold 2 and through apertures 19 and 20 with chamber 11 in manifold 9. These apertures comprise sampling chambers. They communicate at a predetermined time with chamber 4 to receive nuclei bearing media therefrom, then carry it to a position between aperture 7 in inlet manifold 2 and aperture 17 in outlet manifold 9 where it is traversed by radiant energy from source 28 (Figure 1) to measure the nuclei density and later to discharge the media into the chamber 11 of the output manifold.

Each of the axially extending passageways 14 is lined with a moisture bearing material 15 which may be periodically supplied with moisture in any suitable manner, such as a blotter or linen wicking, in order to provide an additional supply of fluid to permit the droplet clouds, once formed, to grow to a size adequate for detection.

In the preferred embodiment illustrated and described, six such passageways, or chambers, for holding individual gaseous samples are shown. However, it is to be understood that the invention is not limited to this number of passageways inasmuch as a different number may be utilized with equal success.

The circumferential aperture 18 in manifold 2 extends for an arcuate distance of approximately 120° so that three adjacent passages, or sampling chambers, 14 are simultaneously open thereto. The outlet manifold 9 contains two diametrically opposed apertures 19 and 20, each of which subtends an arc of approximately 60° so that adjacent passages 14 are simultaneously in communication therewith. The apertures 18 in manifold 2 and 19 and 20 in manifold 9 are so positioned relative to each other that during one operational cycle of the rotating chamber 13 each of the passages 14 is periodically in communication with:

(1) Both the inlet and outlet manifolds;
(2) The inlet manifold alone;
(3) The outlet manifold alone; and
(4) Neither of the manifolds.

Figure 5 and Figure 6, which are sections along the lines A—A and B—B of Figure 1, illustrate the selective communication between the chambers 14 and the respective manifolds. Figure 5 shows, in the upper portion of the figure, a chamber 14 open to chamber 11 at one end and closed at the other. It also shows, in the lower portion of the figure, a chamber 14 open at the input end to chamber 4 and at the output end to chamber 11. The precise sequence of operations will be described in greater detail later when the operation of the instant apparatus is described.

The means for measuring the density of droplet clouds formed in each of the gaseous samples described earlier with reference to Figure 1 and comprising elements 28, 29, 30, 34, 35 and 36 of that figure, is illustrated most clearly in Figure 7. This means is so positioned relative to the manifold and rotatable member 13 that each of the passages 14 in said rotatable member 13 comes into alignment therewith at the point in its operational cycle following expansion and growth of the droplets.

The measuring means comprises a beam of radiant energy which is projected through the port 7 in the inlet manifold, through the passageway 14 in alignment therewith, and out through the port 17 in the opposite manifold to a radiation sensitive device, the output of which is a measure of the number of particles in the passageway. To this end there is provided a source of radiant energy, such as an incandescent lamp 28, positioned adjacent to the inlet manifold 2. A condensing lens arrangement 29 focusses the beam of radiant energy into the passageway 14 in alignment with the ports 7 and 17. Positioned on the other side of the apparatus adjacent to the output manifold is a radiation sensitive device 30, which may be of the photomultiplier, photo-voltaic, or photo-resistive type and which, as described previously with reference to Figure 1, is connected to an amplifying and recording means.

The measuring system described broadly above includes a dark field illuminating optical system which functions to project the beam of radiant energy through the passageway 14 in such a manner that light falls on the radiation sensitive device only if a droplet cloud is present therein to scatter the light. The pair of condensing lenses 29 are positioned adjacent to the incandescent lamp so that the beam of light passes through the transparent member 7a and is focussed at approximately the center of the passageway 14. Positioned in the port 14 of the output manifold is a tubular member 33 having a lens 32 positioned therein which focusses scattered radiant energy onto the detector 30. Positioned on the face of one of the condensing lenses 29 is an opaque circular disc 31 which blocks a portion of the beam of radiant energy and which produces the dark field illumination. That is, there is produced within the passage 14, by virtue of the condensing lens 29, a cone of light subtending an angle "a" containing therein a cone of darkness subtending an angle "b" produced by the opaque disc 31. In this fashion the cone of darkness maintains the cylinder 33 and lens 32 therein unilluminated in the absence of droplet clouds within the chamber 14. That is, in the absence of droplet clouds the device 30 remains completely unilluminated due to the cone of darkness. The presence of droplet clouds, however, serve to scatter the light in the angular volume between the cone of light and the cone of darkness. This scattered light is then projected through the lens 32 onto the radiation sensitive device 30 to produce an electrical output, which is applied to the input of the amplifying device 34. In this manner, the output of the radiation sensitive device is an accurate measure of the number of nuclei since the only light striking it is produced by the scattering due to the droplet clouds.

In order to eliminate the possibility of errors in the output from the radiation sensitive device due to a misalignment of any one of the passages 14 with the ports 7 and 17, it is desirable to apply the output from the radiation sensitive device to the measuring and recording means only when the individual passageways have come into full alignment with the above mentioned ports. To this end there is provided a switching means which controllably connects the output from the radiation sensitive device to the input of the amplifier only when the passageway 14 has come into the desired full alignment with the respective ports. This is accomplished by means of a normally open switch member 36, which may be a microswitch or any other similar device selectively connected between the output of the radiation sensitive device 30 and the input of the amplifier device 34. The switch 36 is periodically closed in synchronism with the full alignment of each individual passage in the rotating chamber member 13. A cam member 37 having a number of cam surfaces 38 on the periphery thereof is mounted on the shaft 16 which rotates the chamber member 13. Each of the cam surfaces 38 is physically aligned with the individual port members and, consequently, moves in synchronism therewith. As the individual passageways 14 come into full alignment with the ports 7 and 17 the associated cam surface 38 comes into contact with the switch member 36, closing it and applying the output of the radiation sensitive device 30 to the amplifying device 34. In this fashion an error-free output signal from the radiation sensitive device is assured.

Figures 8a through 8f show, schematically, the relative positions of two adjacent passages 14 with respect to the various apertures during one operational cycle of the device and illustrate the manner in which various ones of the various gaseous samples are treated prior to being measured.

Figures 8A, 8B, 8C, 8D, 8E, 8F:
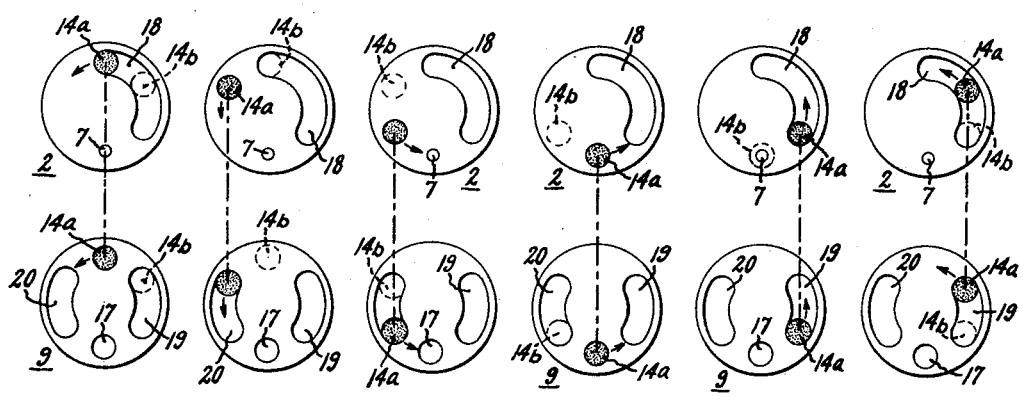
Figures 8a through 8f are diagrammatic illustrations of the relative position of the rotating chamber relative to the input and output manifolds for one operational cycle.

Thus, in Figure 8a the upper drawing illustrates, schematically, the inlet manifold 2 and its aperture member 18 whereas the lower figure illustrates the outlet manifold 9 and its apertures 19 and 20, as well as the relative positions of two adjacent passages 14a and 14b, one illustrated in dappled form and the other in phantom. Figure 8a illustrates that portion of the cycle denominated as the Dwell wherein a fresh sample is present in the passage 14a and is permitted to come to equilibrium. Thus, it can be seen that the passage 14a is in communication with the inlet manifold through the aperture 18 but is not in communication with the outlet manifold. Simultaneously, the adjacent passageway 14b is in communication with both the inlet manifold through the aperture 18 and the outlet manifold through the aperture 19 allowing a fresh gaseous sample to be drawn into the passageway 14b.

One sixth of a cycle later, as shown in 8b, the passage 14a has passed out of communication with the inlet manifold 2 and has come into communication with the outer manifold through aperture 20 and is thus suddenly subjected to the pressure differential provided by the vacuum pump through the control valve 25 and the conduit 12. This sudden expansion of the gaseous sample in the passage 14a causes an adiabatic expansion thereof and due to the sudden cooling produces a degree of supersaturation which initiates condensation of a vapor about any nuclei present within this sample. This portion of the operational cycle is known as the Expand cycle. It can be seen from the position of the adjacent passageway 14b that this passageway and its associated gaseous sample is not, as yet, in the Expand stage but is, on the contrary, in the Dwell stage described with reference to Figure 8a.

One sixth of a cycle later, as illustrated in Figure 8c, the passageway 14a is still in contact with the outlet manifold through the aperture 20 while remaining out of communication with the inlet manifold. During this portion of the cycle the condensation initiated in the previous portion is continued and the droplets grow in size drawing vapor from the saturated sample as well as the moisture lining of the passageway. The adjacent passageway 14b has meanwhile come into contact with the outlet manifold and the source of lower pressure and is thus subjected to the Expand portion of its cycle. It is now apparent that the gaseous sample in chamber 14b is subjected to the various steps of the operational cycle one sixth of a cycle later than the sample in passageway 14a.

Figure 8d shows the relative position one sixth of a cycle later when the passageway 14a has come into alignment with the measuring means and the ports 7 and 17 of the respective manifolds. During this period the beam of radiant energy traverses this passageway and is scattered by the droplet cloud present therein, the amount of scattering being a function of the density of the droplet cloud. Thus, during this portion of the cycle, known as the Read-Out or Measuring portion, the gaseous sample is subjected to its measuring interval. The passageway 14b meanwhile, still one-sixth of a cycle behind, is going through its Growth portion of the cycle prior to being measured.

In the next portion of the cycle, illustrated in Figure 8e, the passage 14a has passed beyond the measuring stage and is now in communication with the inlet manifold by virtue of the aperture 18 and the output conduit by virtue of the aperture 19. During this portion of the cycle, called the Flush cycle, the removal of the sample just measured occurs since the vacuum pump will now tend to pull the expanded and measured sample out of the passage and introduce a new sample into that passageway. Simultaneously, the passageway 14b has come into alignment with the ports 7 and 17 and is being measured during this interval.

The next or Fill portion of the cycle, as illustrated in Figure 8f, sees the passageway 14a still in contact with both manifolds by virtue of the apertures 18 and 19 and during this time the fresh gaseous sample is being pulled into the chamber since the old one has been previously flushed out and exhausted. Again, simultaneously, the passageway 14b has entered into the Flush portion of its cycle, one sixth of an operating cycle behind the passageway 14a.

The whole operational cycle then is initiated again for the passage 14a. It can be seen from this description that each of the passages 14 in the rotating chamber 13 is subjected to a cycle just as that described with regard to passage 14a. Each of the individual passageways will, in a manner similar to that described, undergo the various portions of the operating cycle in such a manner that the phases are staggered by one sixth of a revolution relative to those immediately adjacent to it. Consequently, each individual gaseous sample, represented by each of the passageways 14, simultaneously is processed but is at a different stage of its operating cycle so that all of the time consuming operations such as flushing, filling, expanding and growth of each sample take place while others of the individual samples are going through their measuring interval. In this manner a high degree of speed and accuracy is achieved.

From the foregoing description it can be appreciated that a high speed condensation nuclei measuring device is provided which has a sampling rate much higher than hitherto achieved by present methods and apparati which yet retain the great degree of sensitivity of the present instruments. There is thus provided a condensation nuclei measuring device whose sampling rate is only limited by the time of growth necessary for the droplets to grow to visible size, a period of time on the order of five milliseconds.

While a particular embodiment of this invention has been shown it will, of course, be understood that it is not limited thereto since many modifications both in the circuitry and in the instrumentalities employed may be made. It is contemplated to cover any such modifications as fall within the true spirit and scope of this invention as defined by the appended claims.

What I claim as new and desire to secure by Letters Patent of the United States is:

1. In a high speed condensation nuclei measuring device, the combination comprising means to measure the density of a cloud of droplets, an inlet chamber adapted to provide humidified nuclei bearing gaseous samples to be measured, an outlet chamber connected to an expansion means for said samples, a rotatable member having a multiplicity of individual passages each adapted to hold one of said gaseous samples, means to rotate said member bringing each of said passages successively into alignment with said inlet, outlet, and said measuring means whereby during measurement of one said sample succeeding ones are being admitted and readied for measurement.

2. In a high speed condensation nuclei measuring device the combination comprising means to measure the density of a cloud of droplets, a rotatable member having a multiplicity of individual passages each for containing a nuclei bearing gaseous sample, expansion means to bring said samples to a droplet forming supersaturated condition, the rotation of said member bringing each sample containing passage successively into alignment with said expansion and measuring means whereby measurement of one sample occurs while successive samples are being readied.

3. In a high speed condensation nuclei measuring device the combination comprising means to measure the density of a cloud of droplets, a movable chamber means for holding a multiplicity of individual nuclei bearing gaseous samples, expansion means to bring said samples to a droplet forming supersaturated condition, said chamber means bringing each of said samples successively into alignment with said expansion and said measuring means whereby the droplet density of one of said samples is being measured while subsequent ones are expanded prior to measurement.

4. In a high speed condensation nuclei measuring device the combination comprising means to measure the density of a cloud of droplets, a rotatable member having a multiplicity of individual passages adapted to hold a nuclei bearing gaseous sample, an inlet chamber having an aperture to permit periodic communication of each of said passages with said chamber upon rotation of said member, an apertured outlet chamber connected to an expansion means to permit periodic communication of each said passage with said outlet chamber and expansion means upon rotation of said member, means to rotate said member to sequentially bring each passage selectively into communication with said input and output chambers and said measuring means whereby during measurement of one sample succeeding ones are admitted and readied for measurement.

5. In a high speed condensation nuclei measuring apparatus, the combination comprising, means to perform a sequence of operations on nuclei bearing gaseous samples including means to form droplet clouds in said samples and means to measure the density of said droplet clouds, and means to perform said sequence of operations simultaneously on a multiplicity of said samples, said last named means being operated to stagger said sequence for different ones of said multiplicity of samples whereby different ones of said sequence of operations are carried out simultaneously on different ones of said samples.

6. In a high speed condensation nuclei measuring device the combination comprising a chamber means adapted to hold a multiplicity of nuclei bearing samples, means to perform a sequence of operations on each of said multiplicity of samples, including means to form droplet clouds in said sample and means to measure the density of said droplet clouds, and means to stagger said sequence of operations for said multiplicity of samples whereby different operations of said sequence are performed simultaneously on each of said samples.

References Cited in the file of this patent

UNITED STATES PATENTS 2,684,008    Vonnegut _____ July 20, 1954

OTHER REFERENCES

"Cloud Chamber for Counting Nuclei in Aerosols," Saunders, pages 273–277 in "Review of Scientific Instruments," vol. 27, No. 5, May 1956.